United States Patent [19]

Summers

[11] 4,162,727
[45] Jul. 31, 1979

[54] CONVEYOR BELT

[75] Inventor: Frank B. Summers, Marblehead, Mass.

[73] Assignee: Fabreeka Products Company, Boston, Mass.

[21] Appl. No.: 845,634

[22] Filed: Oct. 26, 1977

[51] Int. Cl.² ............. B65G 15/42; B65G 21/20
[52] U.S. Cl. ................. 198/688; 198/836; 198/847
[58] Field of Search ............. 198/540, 547, 616, 688, 198/818, 823, 836, 837, 847

[56] References Cited

U.S. PATENT DOCUMENTS

| 137,224 | 3/1873 | Mansfield | 198/688 |
|---|---|---|---|
| 814,908 | 3/1906 | Hummel | 198/847 |
| 979,200 | 12/1910 | Prosser | 198/688 |
| 2,305,484 | 12/1942 | Merchen | 198/837 |
| 2,575,813 | 11/1951 | Hutchins | 198/688 |
| 2,635,735 | 4/1953 | Smith | 198/699 |
| 2,783,870 | 3/1957 | Tippet | 198/837 |
| 2,880,128 | 3/1959 | Fink | 198/688 |
| 3,069,786 | 12/1962 | Nichols, Jr. | 198/818 |

Primary Examiner—Robert B. Reeves
Assistant Examiner—Jeffrey V. Nase
Attorney, Agent, or Firm—Dike, Bronstein, Roberts, Cushman & Pfund

[57] ABSTRACT

A conveyor belt designed especially for conveying particulate material, said belt being provided with a central ribbed portion for tractive engagement with the particulate material, planar portions along its opposite longitudinal edges for extension beneath skirt boards at said edges designed to retain the particulate material on the conveyor belt, and longitudinally extending grooves between the centrally located ribbed portion and the planar portions for receiving the lower edges of skirting fastened to the skirt boards at a level below the level of the surfaces of the planar portions.

1 Claim, 4 Drawing Figures

CONVEYOR BELT

BACKGROUND OF INVENTION

Ribbed conveyor belts are old in the art as disclosed in U.S. Pat. Nos. 3,070,210; 2,815,850; 2,784,835; and 2,400,667 and the provision of a ribbed conveyor belt with planar portions along its opposite longitudinal edges for engagement beneath the skirt boards on the conveyor supporting frame is shown in Pat. No. 2,880,128. In that patent, the lower edges of the skirt rest upon the surfaces of the planar portions at the opposite longitudinal edges of the belt in the same plane as the surfaces of the planar areas between the ribbed center portion of the belt, and since the skirting is of a flexible material and is subjected to uneven of the particulate material being carried along by the belt, and varying degrees of wear and wetness or drying, its lower edge which has contact with the planar surfaces may lift away from the planar surfaces so that the particulate material can escape at the sides of the conveyor belt. The purpose of this invention is to minimize such deflection of the lower edges of the skirts and to thus minimize the escape of particulate material.

SUMMARY

The conveyor belt as herein illustrated comprises a laminate of plies of fabric and rubberoid, the rubberoid ply being sandwiched between a fabric face ply at one side and a fabric backing ply at the other side. The face ply has centrally thereof a ribbed portion and at opposite longitudinal sides of which there are planar portions, and intermediate the ribbed portion and the planar portions are grooves. The ribs extend transversely in longitudinally-spaced, parallel relation and there are planar areas between ribs which lie in the plane of the planar portions at the longitudinal sides. The grooves are coextensive in length with the ribbed portion and the planar areas at the longitudinal sides are depressed into the face ply and the intermediate ply and are approximately 1/16 inch deep and ¼ inch wide. The overall thickness of the belt is approximately ⅛ inch and the back side is uniformly flat. The belt is used in combination with a conveyor frame supporting a flat bed over which the conveyor belt is arranged to move and has at its longitudinal edges skirt boards parallel to the surface of the bed. The skirt boards are spaced from the bed to provide gaps into which the planar portions along the opposite longitudinal edges of the belt extend. Skirts are secured to the skirt boards in inclined positions with their lower edges extending across the gaps into said longitudinally extending grooves.

The invention will now be described in greater detail with reference to the accompanying drawings, wherein.

Figure 1:
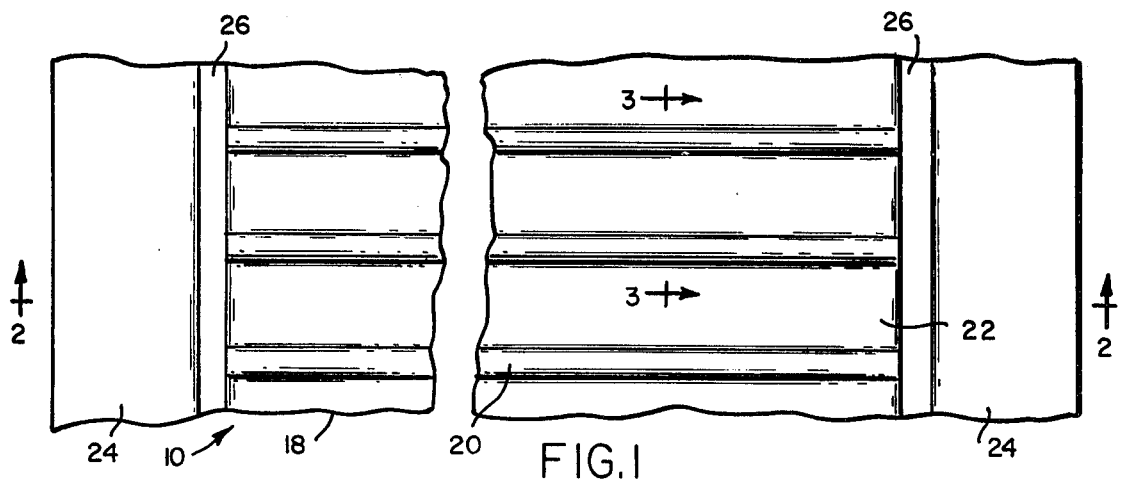
FIG. 1 is a fragmentary plan view of the conveyor belt.
Figure 2:
FIG. 2 is a transverse vertical section taken on the line 2—2 of FIG. 1.
Figure 3:
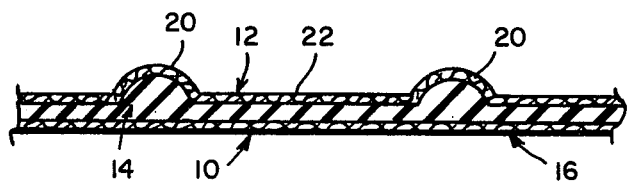
FIG. 3 is a longitudinal vertical section taken on the line 3—3 of FIG. 1.

Referring to the drawings, the conveyor belt 10 is of multi-ply construction comprising a face ply 12, an intermediate ply 14, and a back ply 16. The face and back plies 12 and 14 are comprised of an inpregnated fabric, for example, a polyester duck impregnated with a natural rubber to provide a friction-engendering top and bottom surface to the belt. The intermediate ply 14 may be natural rubber.

The belt is processed to have a centrally located, longitudinally extending portion 18 designed particularly for transmitting particulate material along horizontal or inclined surfaces and, for this purpose, is provided with longitudinally spaced, parallel, transversely-extending, upstanding ribs 20 which in section are semi-cylindrical. The areas 22 between the ribs are flat planar surfaces. At the opposite longitudinal edges of the belt, there are continuous, uninterrupted planar portions 24—24, the surfaces of which lie in the planes of the planar surfaces 22. The planar portions 24—24 are coextensive with the intermediate ribbed portion 18. Between the ribbed portions 18 and the planar portions 24—24, there are longitudinally extending narrow grooves 26—26 which define depressed areas, the bottoms of which are below the planes of the planar portions 22 and 24. These grooved portions are also coextensive with the ribbed and planar portions.

The overall thickness of the belt is approximately ⅛ inch, the depth of the grooves 26—26 is approximately 1/16 of an inch, the width of the grooves ¼ inch, and the height of the ribs is approximately 1/16 of an inch. The grooves 26—26 are formed in the face ply 12 and the intermediate ply 14, leaving the back ply uniformly flat throughout its width.

Figure 4:
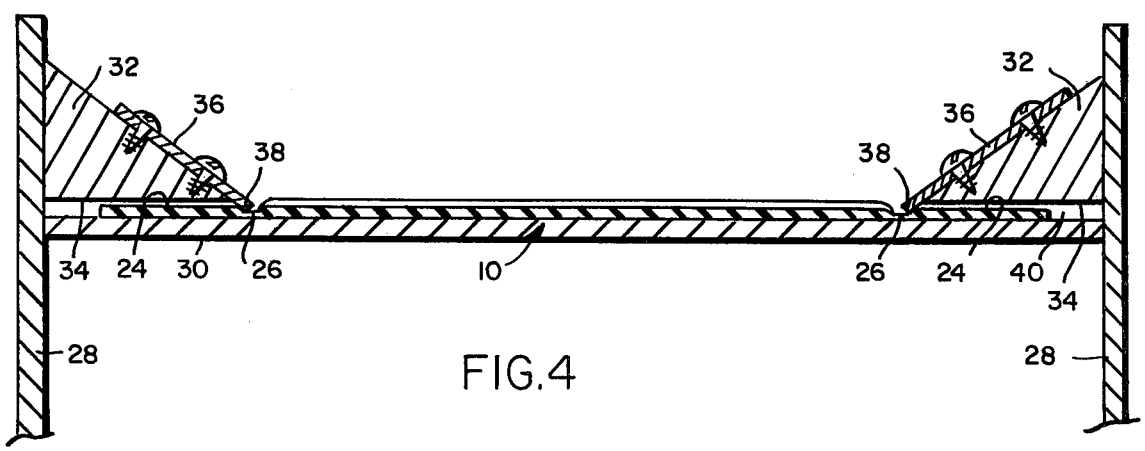
FIG. 4 is a transverse section of a conveyor frame showing the conveyor belt in relation to the skirt boards at opposite longitudinal edges thereof and the skirts mounted to the skirt boards.

The belt is used in conjunction with a conveyor frame, FIG. 4, comprising spaced, parallel, vertically-disposed frame members 28—28 which support between them a horizontally disposed bed 30, upon which the upper run of the belt 10 rests and is moved longitudinally in a horizontal or inclined plane. In accordance with conventional practice, skirt boards 32—32 are fastened to the frame at opposite sides of the bed so as to overlie the planar portions 24—24 of the belt in such a way as to allow the edges of the belt to move freely along the bed. To this end, the skirt boards are mounted with their lower sides 34—34 spaced from and parallel to the bed to provide gaps 40—40 for receiving the planar portions of the belt. Skirts 36—36 are fastened to the skirt boards so as to incline downwardly toward the surface of the conveyor belt and, in accordance with this invention, the lower edges 38—38 of the skirts are extended across the gaps 40—40 between the lower sides of the skirt boards and the upper surface of the bed into the grooves 26—26 in the surface of the belt, thus to prevent escape of any particulate material below the lower edges of the skirts and to minimize displacement of the lower edges of the skirt by particulate material traveling along on the surface of the bed.

The provision of the grooves 26—26 between the ribs and planar portions of the belt vastly improves the operation of the belt in that it prevents displacement thereof and, hence, prevents not only loss of the particulate material at the edges of the belt, but also packing of the gaps to the extent that the conveyor must be shut down for cleaning.

It should be understood that the present disclosure is for the purpose of illustration only and includes all modifications or improvements which fall within the scope of the appended claims.

I claim:

1. The combination with a conveyor frame and flat bed supported thereby of a conveyor belt arranged to be moved along the bed, said belt comprising a laminate of two fabric plies with a ply of rubberoid therebetween, said belt having a flat bottom surface for freedom of movement along the bed and a top side for implementing motion to material to be transported by the belt, said top side comprising parallel, longitudinally spaced, transversely extending, upwardly-convex ribs interspersed with flat planar surfaces and said ribs occupying a major portion of the width of the belt between its longitudinal edges, rigid skirt boards mounted to the frame along the opposite longitudinal sides of the bed, said rigid skirt boards overlying the opposite side of the belt and having top sides sloping obliquely downwardly toward the top of the bed for confining material transported by the belt, and bottom sides parallel to and spaced from the bed and said belt having along its opposite longitudinal sides planar portions, the surfaces of which lie in the plane of the interspered planar portions, said planar portions at the sides extending laterally from the ends of the ribs beneath the bottom sides of the skirt board, longitudinally-extending grooves in the top side of the belt situated between the planar surfaces at the sides and the ends of the ribs and flexible skirts fastened to the inclined top sides of the skirt boards so as to slope downwardly toward the top of the belt and positioned with their lower edges extending beyond the lower edges of the skirt boards into the longitudinally-extending grooves.

* * * * *